United States Patent [19]
Dynan

[11] Patent Number: 4,863,113
[45] Date of Patent: * Sep. 5, 1989

[54] WRITING TABLET

[76] Inventor: Michael V. Dynan, P.O. Box 757, Orleans, Mass. 02653

[*] Notice: The portion of the term of this patent subsequent to Nov. 22, 2005 has been disclaimed.

[21] Appl. No.: 206,200

[22] Filed: Jun. 13, 1988

Related U.S. Application Data

[63] Continuation of Ser. No. 922,193, Oct. 23, 1986, Pat. No. 4,786,010.

[51] Int. Cl.$^4$ .................... B65H 75/16; B43L 1/00
[52] U.S. Cl. .................................. 242/84.8; 434/408
[58] Field of Search ............ 33/137 R, 138; 434/346, 434/408, 418; 242/107, 84.8

[56] References Cited

U.S. PATENT DOCUMENTS

| | | | |
|---|---|---|---|
| 1,839,439 | 1/1932 | Raymond | 434/408 |
| 2,914,269 | 11/1959 | Freeman | 242/84.8 |
| 3,672,597 | 6/1972 | Williamson | 242/107 |
| 3,838,520 | 10/1974 | Quenot | 33/138 |
| 3,847,865 | 11/1974 | Duggins | 260/42.52 |
| 4,636,582 | 1/1987 | Moriwaki | 178/19 X |

FOREIGN PATENT DOCUMENTS 1547479 11/1968 France .
1534971 6/1978 United Kingdom .

OTHER PUBLICATIONS

Correspondence with Stanley Works dated Apr. 24, 1987, May 6, 1987, and Jun. 2, 1988, relating to Stanley tape rules having write-on features, no date given, showing Stanley tape rules 61-312, PL416, PL412.

Primary Examiner—David Werner
Attorney, Agent, or Firm—Blodgett & Blodgett

[57] ABSTRACT

An erasable writing tablet for notation of dimensions and other information. The erasable writing table is adapted to be attached to a tape measure or any other conforming receptive surface. The material composition of the erasable writing tablet is sold under the trade name "Corian". The abrasiveness of this material permits the effacement of the notations by sandpaper or an eraser while maintaining the desired surface properties of the erasable writing tablet. A storage pocket is adapted to receive the means for effacing writing on the erasable writing tablet.

10 Claims, 2 Drawing Sheets

WRITING TABLET

This is a continuation of co-pending application Ser. No. 922,193 filed on Oct. 23, 1986 now U.S. Pat. No. 4,786,010.

BACKGROUND OF THE INVENTION

The present invention generally relates to an erasable writing tablet and, more particularly, to a combination measuring device and erasable writing tablet.

The frequent use of a tape measure and other measuring devices by the handyman and craftman alike on a work project is necessary to obtain accurate dimensions. More important, however, is the need to record and then transfer the measurements obtained from the work site to the workbench in order to mark the workpiece. Memory alone may often prove unreliable, and a piece of paper is invariably unavailable or restricted in use by adverse weather conditons.

Past attempts to incorporate a markable recording plate and a tape measure have proved unsuccessful. Devices of this type, for example, have utilized a series of superimposed plastic sheets upon which inscriptions are impressed. The exposed plastic sheets and the associated movable components of these devices have failed to survive rigorous use in the trade. In addition, one needed to purchase a new tape measure having the recording plate; where one's existing tape measure may still have been functional.

Alternatively, other devices have attached a single plastic sheet writing disc to the housing of a tape measure. The continued use of this plastic sheet caused pressure indentations on the surface and thereby making it unsuitable for writing. Furthermore, notations made on the plastic sheets frequently become smudged and unreadable during the course of noting additional measurements. These and other difficulties experienced with the prior art devices have been obviated by the present invention.

It is, therefore, a primary object of the present invention to provide an erasable writing tablet for a measuring device which can be readily written upon to record dimensions and later erased clean.

Another object of the invention is the provision of erasable writing tablet which is inexpensive to manufacture, and which is capable of a long life of useful service.

A further object of the invention is the provision of an erasable writing tablet which includes a storage pocket for receiving means to efface writing on the writing tablet.

It is another object of the invention to provide a combination tape measure and writing tablet.

A still further object of the invention is the provision of an erasable writing tablet having a renewable abrasive writing surface.

With these and other objects in view, as will be apparent to those skilled in the art, the invention resides in the combination of elements and conditions set forth in the specification and covered by the claims appended hereto.

SUMMARY OF THE INVENTION

In general, the invention consists of an erasable writing tablet for notation of dimensions and other information. The erasable writing tablet is adapted to be secured to a measuring device having an outer flat surface, or made in combination therewith.

The erasable writing tablet includes a flat surface having abrasive characteristics suited for inscription by a graphite pencil. The surface is resistent to indentation by pressure applied during writing and to smudging of recorded notations. Notations are removed by sandpaper or erased by an eraser while maintaining the abrasive surface properties. A recess in the writing tablet provides part of a storage pocket for holding sandpaper.

DESCRIPTION OF THE PREFERRED EMBODIMENT

Figure 1:
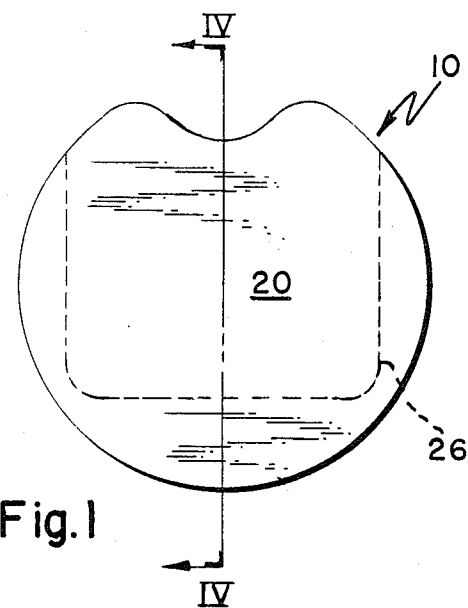
FIG. 1 is a front elevational view of the writing tablet of the present invention.
Figure 2:
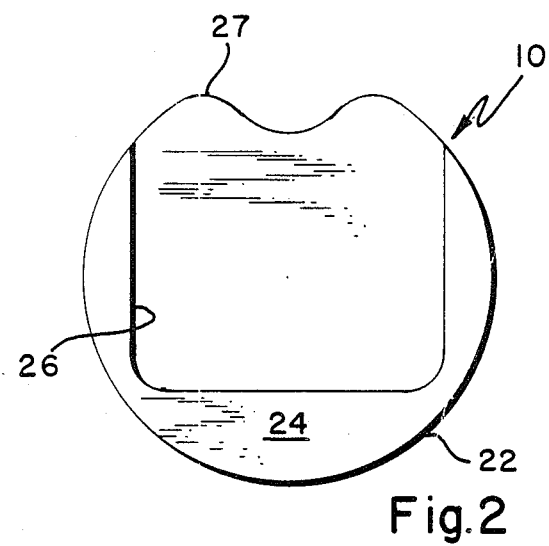
FIG. 2 is a rear elevational view of the writing tablet of FIG. 1.

Referring first to FIGS. 1 and 2, which best show the general features of the invention, an erasable writing tablet, indicated generally by reference numeral 10, is shown for use with a measuring device. The erasable writing tablet 10 is provided with a first flat surface 20 which is sufficiently hard and abrasive to be written on by a standard graphite pencil and to have the writing erased by a standard pencil eraser, a second flat surface 24 disposed on the opposite side of the first flat surface, and an edge surface 22 which is transverse to and between the first and second flat surfaces. The first flat surface 20, however, is softer than standard sandpaper, which further enables the writing to be removed by effacing with sandpaper. The writing characteristics of the first flat surface are not changed by the use of sandpaper of medium grit. The ready availability of sandpaper to the craftsman makes it the means of choice for removal of writing from the erasable writing tablet 10.

Figure 5:
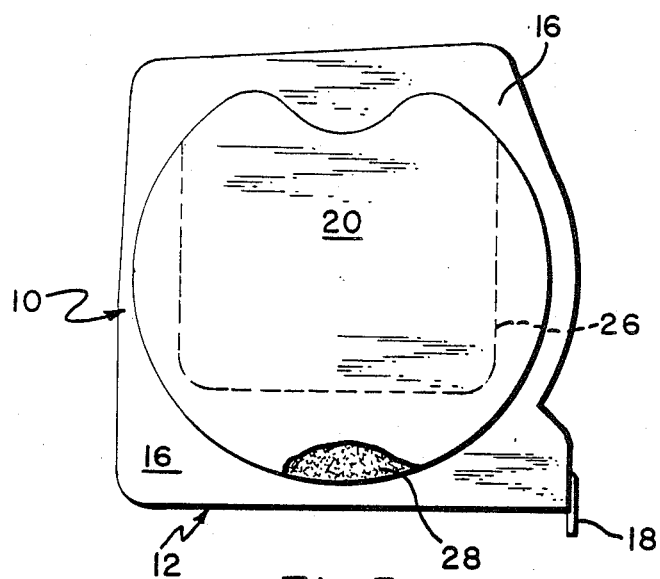
FIG. 5 is a front elevational view of the writing tablet of the present invention shown applied to a conventional tape measure.
Figure 6:
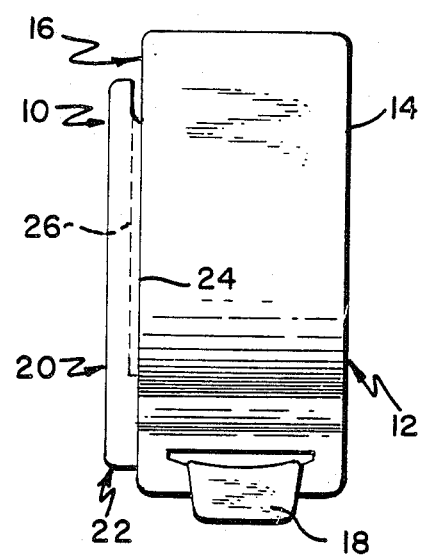
FIG. 6 is a right side elevations view of the writing tablet and tape measure, taken along the line I—I of FIG. 1.
Figure 7:
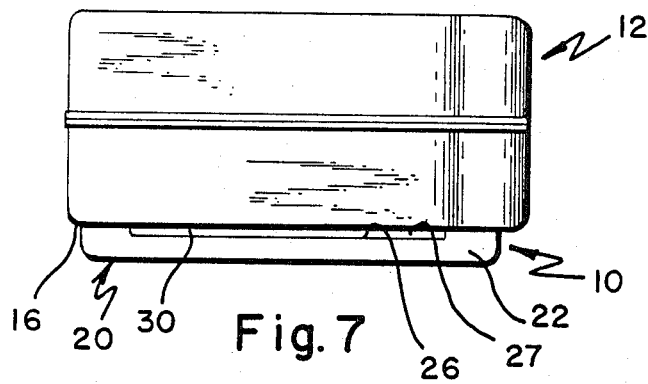
FIG. 7 is a top plan view of the writing tablet and tape measure, taken along the line II—II of FIG. 1.

The second flat surface 24 is adapted to be secured to a measuring device such as a tape measure 12, as shown in FIGS. 5-7. The tape measure 12 is of a conventional form having a housing 14 which includes an outer flat surface 16 and an extendable and retractable measuring tape 18 coiled therewithin. The second flat surface 24 is secured to the outer flat surface 16 of the tape measure 12 by use of standard adhesives including epoxy or two-way tape. The adhesive used in the prefereed embodiment is silicon rubber caulk 28 as represented in the cut away section of FIG. 5. The silicon rubber caulk 28 provides effective shock absorbing properties against impacts received by the erasable writing tablet 10.

Figure 3:
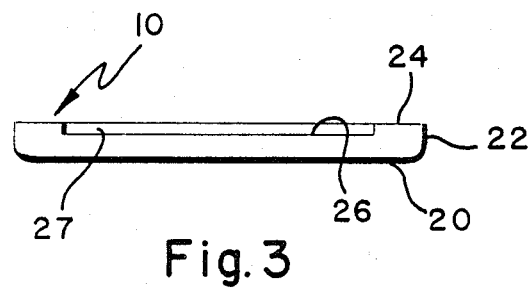
FIG. 3 is a top plan view of the writing tablet of FIG. 1.
Figure 4:
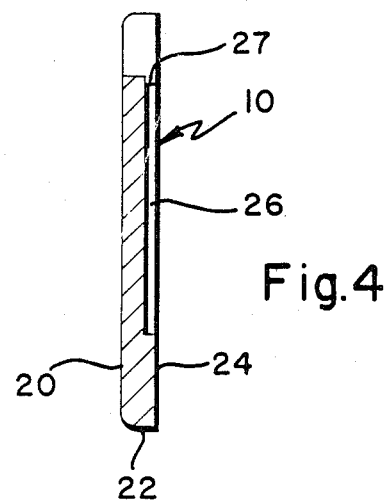
FIG. 4 is a cross-sectional view of the writing tablet taken along the line VII—VII of FIG. 1.

The second flat surface 24 is provided with a recess 26 and recess opening 27 which extends through the edge surface 22 as shown in FIGS. 2-4. On securement of the second flat surface 24 to the surface 16 of the measuring device, a storage pocket 30 is formed. The storage pocket 30 is adapted for holding sandpaper. The sandpaper is removably inserted from the storage pocket 30 from the recess opening 27.

The surface characteristics of the erasable writing tablet 10 permit the craftsman to note a series of dimensions and other necessary information thereon. Although there are many compositions of material which may be utilized as a writing tablet, these materials often fail to maintain their surface characteristics after extended usage. A material which has been found to maintain its surface characteristics, and where the noted dimensions are resistant to finger smudging, is made of a polymer containing an abrasive inorganic filler. The material of the preferred embodiment comprises a polymethyl methocrylate resin containing a uniformly dispersed alumina trihydrate filler, which is manufactured by E. I. Dupont de Nemours & Co., and sold under the trademark "CORIAN". The uniform dispersal of the filler within the composition of the writing tablet provides a renewable abrasive writing surface for inscription following cleaning with sandpaper.

A tape measure combination (not shown) is provided with a housing which includes outer flat surface and a coiled extendable and retractable measuring tape. The outer flat surface comprises an erasable writing tablet of the present invention adapted to be a component part of the tape measure housing.

It is obvious that minor changes may be made in the form and construction of the invention without departing from the material spirit thereof. It is not, however, desired to confine the invention to the exact form herein shown and described, but it is desired to include all such forms as properly come within the scope claimed.

The invention having been thus described, what is claimed as new and desired to secure by Letter Patent is:

I claim:

1. A measuring device comprising:
   (a) a housing having at least one outer surface,
   (b) a writing tablet formed of a solid and rigid polymer block with abrasive properties, the abrasive properites being a characteristic of the writing tablet's composition which contains an inorganic filler of abrasive particles, the writing tablet having an inner surface, an edge surface and a flat outer surface, said inner surface being attached to said outer surface of the housing, the writing tablet being sufficiently hard and abrasive to permit said outer surface to be inscribed by a standard graphite pencil, said writing tablet being softer than sandpaper to enable the inscribed outer surface to be abraded with sandpaper, whereby the outer surface is renewed and receptive to further inscription after subsequent and repeated abrading by sandpaper, and
   (c) means for attaching said writing tablet to said measuring device.

2. A measuring device as recited in claim 1, wherein the writing tablet comprises a polymethyl methacrylate resin having a uniformly dispersed alumina trihydrate filler, said polymethyl methacrlyate resin being manufactured by E. I. DuPont de Nemours & Co., and sold under the trademark "CORIAN".

3. A measuring device as recited in claim 1, wherein said inner surface of the writing tablet surface includes a recess which extends through said edge surface to form a storage pocket between said inner surface and said outer surface of the housing of the measuring device, said pocket adapted for storage of sandpaper to provide the means for abrading inscriptions on said outer surface of the writing tablet.

4. A measuring device as recited in claim 1, wherein said means for attaching said inner surface of the writing tablet to said outer surface of the housing of the measuring device is silicon rubber caulk, said silicon rubber caulk further providing shock absorbing properties against impacts received by said writing tablet.

5. A measuring device as recited in claim 1, wherein said means for attaching said inner surface of the writing tablet to said outer surface of the housing of the measuring dvice is adhesive glue.

6. A writing tablet for a measuring device comprising a solid and rigid polymer block with abrasive properties, the abrasive properties being a characteristic of the writing tablet's composition which contains a uniformly dispersed inorganic filler of abrasive particles, the tablet having an inner surface, an edge surface and a flat outer surface, the writing tablet being sufficiently hard and abrasive to enable said outer surface to be inscribed on by a standard graphite pencil, said tablet being softer than sandpaper to enable the inscribed outer surface to be abraded with sandpaper, whereby the outer surface is renewed and receptive to further inscriptions after subsequent and repeated abrading by sandpaper.

7. A writing tablet as recited in claim 6, wherein the writing tablet comprises a polymethyl methacrylate resin having a uniformly dispersed alumina trihydrate filler, said polymethyly methocrylate resin being manufactured by E. I. DuPont de Nemours & Co., and sold under the trademark "CORIAN".

8. A writing tablet as recited in claim 6, wherein said inner surface of the writing tablet includes a recess which extends through said edge surface to form an opening, said inner surface adapted to be attached to an article having a conforming surface to said inner surface, whereby a pocket is formed for storage of sandpaper to provide the means for abrading inscription on said outer surface of the writing tablet.

9. A measuring device comprising at least one flat outer surface, said outer surface being formed of a solid and rigid polymer block with abrasive properties, the abrasive properties being a characteristic of the polymer's composition which contains an inorganic filler of abrasive particles, the polymer being sufficiently hard and abrasive to permit said outer surface to be inscribed by a standard graphite pencil, said polymer being softer than sandpaper to enable the inscribed outer surface to be abraded with sandpaper, whereby the surface is renewed and receptive to further inscription after subsequent and repeated abrading by sandpaper.

10. A measuring device as recited in claim 9, wherein said rigid polymer block comprises a polymethyl methacrylate resin having a uniformly dispersed alumina trihydrate filler, said polymethyl methacrylate resin being manufactured by E. I. DuPont de Nemours & Co., and sold under the trademark "CORIAN".

* * * * *